INDUCTION RADIO SYSTEM FOR VEHICLES

Filed March 15, 1968

INVENTORS
MASAO SUGI &
KENICHI YOSHIDA
BY
CAROTHERS & CAROTHERS
THEIR ATTORNEYS

1

3,527,897

INDUCTION RADIO SYSTEM FOR VEHICLES

Masao Sugi, Kamakura, and Kenichi Yoshida, Sakai, Japan, assignors to Sumitomo Electric Industries, Ltd., Osaka, Japan, a company of Japan Filed Mar. 15, 1968, Ser. No. 713,380
Claims priority, application Japan, Mar. 20, 1967, 42/17,274, 42/17,277
Int. Cl. H04b 5/00
U.S. Cl. 179—82 7 Claims

ABSTRACT OF THE DISCLOSURE

A four-conductor transmission line which consists of two two-wire transmission lines each respectively having their lines or conductors transposed at regular intervals. One of these two wire transmission lines is permitted to overlie the other with a position shift to separate respective transposition or crossover intersections. Each of the two-wire lines is excited with an identical signal but with a phase difference that permits the signal receiving level emitted from the transmission line to always be greater than zero.

BACKGROUND OF THE INVENTION

This invention relates generally to induction radio systems for moving vehicles and more particularly to multiple conductor transmission lines and antennas employed therein.

Conventional induction ratio transmission systems presently employed for communication between moving vehicles or moving vehicles and wayside stations generally comprise two-wire transmission lines, transmission lines consisting of two parallel conductors, together with a loop antenna mounted on the moving vehicle which is coupled to the line for reception and transmission of a signal thereon.

Interferences induced in such two-wire transmission lines due to voltages and corresponding current induced in the line by voltages or currents in paralleling lines or radiation from outside communication systems are common. Furthermore, such two-wire transmission lines commonly emit radiation which interferes with other communication systems.

To avoid cross talk between communication lines and reduce noise current, such two-wire transmission lines are commonly provided with transpositions. In other words, the spaced parallel conductors cross each other at regular intervals. By transposing the lines, very nearly equal voltages will be induced in both wires of the communication line and hence there will be no net voltage across them or in series with them to cause the flow of noise currents. As also stated this also avoids cross talk between lines.

Such two-wire transposed transmission lines are laid along the vehicle track or route and a loop antenna, which is mounted on the vehicle such that its plane is parallel with the plane of the two conductors, is provided to excite and receive signals in the lines.

Such transposition two-wire transmission lines are, however, not suitable for induction radio systems for moving vehicles due to the fact that the cross points of the transmission line cause interruptions of the coupled signal between the transmission line and the antenna aboard the moving vehicle. This causes considerable noise in the communication signal. Furthermore, the antenna interferes with surrounding or outside communication system when it is excited to induce a signal in the transmission line.

2

SUMMARY OF THE INVENTION

The induction radio system of the present invention employs a transmission line which consists of two two-wire transmission lines, each respectively having spaced parallel conductors which cross each other or are transposed at regular intervals. One of the transposed two-wire lines is positioned in parallel and overlies the other transposed two-wire transmission line with a position shift to separate their respective crossover intersections. An exciter means is provided to excite each of these two-wire lines independently with identical signals which have a phase difference that permits the signal receiving level to always be greater than zero. This eliminates the absense of transmission which is experienced at the crossover intersection on the conventional transposed two-wire transmission line.

As long as this phase difference between the two exciter signals is not zero or 180°, the signal receiving level will always be greater than zero as the antenna moves therealong passing over the conductor crossover intersection of each two-wire transmission line because the combined signals of both transmission lines will never be permitted to cancel each other out and thereby render the receiving signal zero.

It is preferred that this phase difference be $\pi/2$ as this provides the maximum signal receiving level which may be emitted from the transmission line.

The preferred position shift between the two two-wire transmission lines is ½ the transposition interval or crossover interval of one of the two-wire transmission lines although different position shifts may be employed.

The preferred receiving antenna aboard the moving vehicle comprises two receiving antennas of the same type which are inductively coupled with the transmission line. These antennas are separated by an odd number multiple of the cross interval or transposition interval of one of the two-wire lines. The terminals of these two antennas are connected such that the combination antenna continually receives a signal from the transmission line. The magnetic field at two points on the transmission line separated from each other by the distance between crosspoints or the transposition interval, are in directions opposite to each other which permits the antenna to receive the signal without interference. The directions of the excited magnetic fields of the two antennas are reversed with respect to each other in order to permit excitation of the transmission line and at the same time thereby preventing interference to outside communication systems. However, such an antenna arrangement need not be employed with the transmission line of the present invention if one is not concerned with the interference of other communication systems in the area. In any event, the signal receiving level will never be zero.

Other objects and advantages appear hereinafter in the following description and claims.

The accompanying drawings show for the purposes of exemplification, without limiting the invention or claims thereto, certain practical embodiments illustrating the principles of this invention wherein:

Figures 1A, 2:
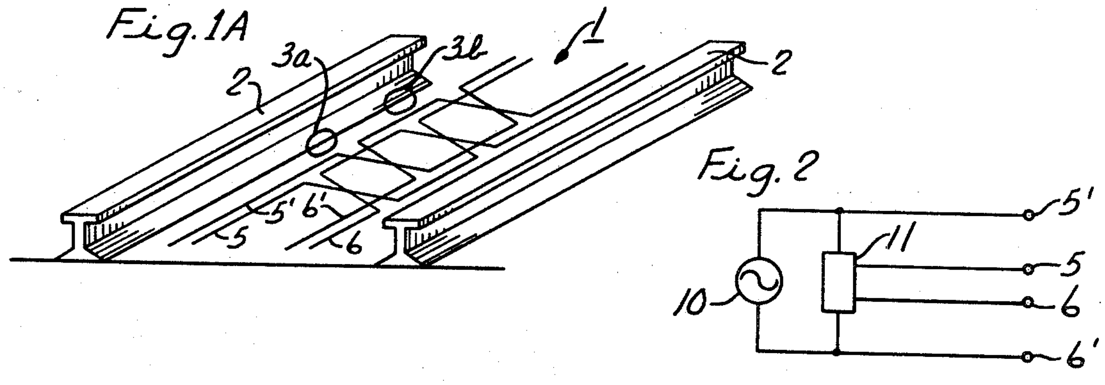
FIG. 1A is a perspective view illustrating one embodiment of the construction of the induction radio transmission system of the present invention.
FIG. 2 is a schematic diagram illustrating the manner in which the transmission line of FIG. 1 is excited.
Figure 1B:
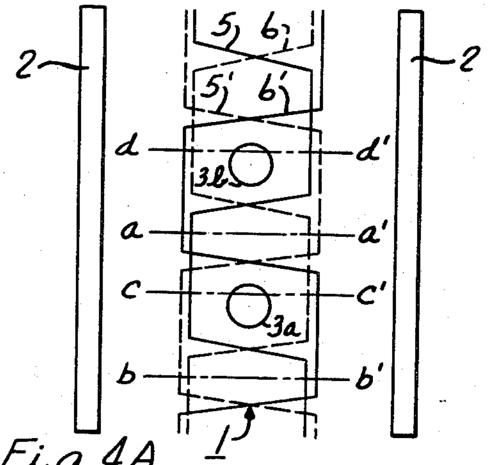
FIG. 1B is a plan view of the system shown in FIG. 1.

Referring to FIGS. 1A and 1B, the transmission line 1 is positioned in parallel and lies along the vehicle route between the rails 2. The transmission line 1 consists of two two-wire transmission lines, namely, the one line consisting of conducting wires 5 and 6 and the other transmission line consisting of the second pair of conductors 5′ and 6′. Each pair of conducting wires are independently transposed or twisted at the same pitch and spacing. One transposed two-wire transmission line overlies the other in parallel with a position shift of ½ the cross interval or ½ the pitch to separate the cross intersections such that the cross-intersections of pair 5′, 6′ do not overlie adjacent cross-intersections of pair 5, 6. Two identical signals are fed to each of the pairs 5, 6 and 5′, 6′ but with phase difference of $\pi/2$. Such a means for excitation is illustrated in FIG. 2.

In FIG. 2, the signal generator 10 is connected to conductor pair 5′, 6′ and conductor pair 5, 6 is connected to the same generator through the phase shifting circuit 11 which provides the same signal to conductors 5 and 6 but with a phase difference of $\pi/2$.

Figure 3:
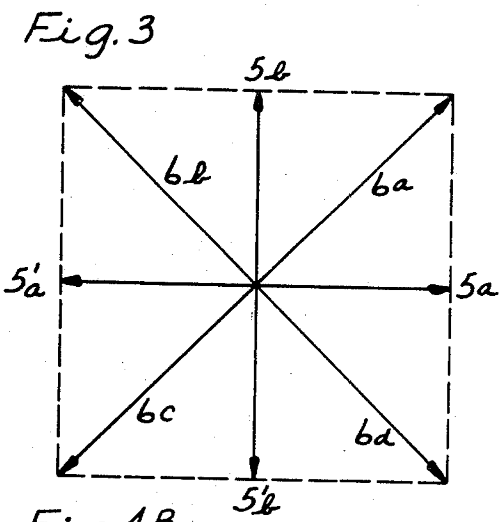
FIG. 3 is a vector diagram of the magnetic field produced by the transmission line shown in FIG. 1.

The receiving signal as received by a single antenna as illustrated for example at *3a*, and as further seen for example, at the cross section *b*, *b′* in FIG. 1B, can be expressed by a vector *6a* in FIG. 3 as a resultant from the two vectors *5a* and *5b*. Vectors *5a* and *5b* each correspond to a receiving signal coupled with the wire pair 5–6 and the wire pair 5′–6′, respectively, and the receiving signal at the cross section *c–c′* separated by half an interval between cross points from the cross section *b–b′*, can be expressed by the resultant vector *6b* since the phase of the induced voltage by the wire pair 5–6 is reversed by reason of the intermediate cross point or interpositioning. In a similar manner, the receiving signals at the cross sections *a–a′*, which is separated by half the interval from *c–c′*, and at the cross section *d–d′*, separated by half the interval from *a–a′*, can be expressed by the vectors *6c* and *6d* respectively. It is thus illustrated by this figure that the signal receiving level can never be zero. If vectors *6a* through *6d* are each represented by $V_r$, and vector *5a* or *5a′* by $V_1$, and *5b* or *5b′* by $V_2$, then $|V_r|^2=|V_1|^2+|V_2|^2=2|V_1|^2$.

Figure 4A:
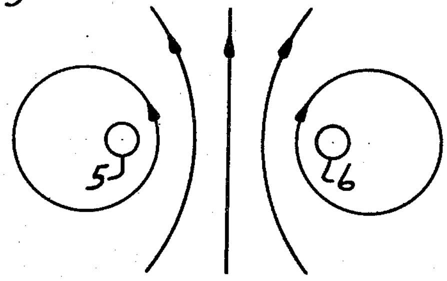
FIG. 4A is a diagrammatic sketch of the magnetic field of one of the two two-wire transmission lines comprising the transmission line shown in FIG. 1.
Figure 4B:
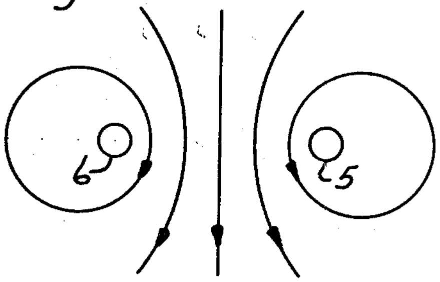
FIG. 4B is a diagrammatic sketch illustrating the magnetic field of the two-wire transmission line illustrated in FIG. 4A after it has been reversed by an adjacent transposition reversal.

Since the conducting wires comprising the transmission line are transposed, the magnetic fields for each pair are as shown in FIGS. 4A and 4B. FIGS. 4A and 4B respectively show by the curved lines including the arrows, the direction of the magnetic field in a transverse section of one pair of conductors 5 and 6 and in a transverse section which is removed from the latter mentioned section by a distance of one full pitch or crossover interval where the conductors 5 and 6 have their position reversed. The same may be said with respect to the conductor pair 5′, 6′.

As is clear from the drawings, the magnetic fields accompanying each pair reverse their direction at every transposed interval so that it is possible to simultaneously suppress interference with outside communication systems by radiation to the outside from this transmission line and to suppress noise and interfering electric waves which might otherwise enter the transmission line from the outside.

It is also possible to provide an antenna for the transmission line of the present invention which will excite the same but suppress interference with outside communication systems. In other words, an antenna is provided by the present invention which may either transmit or receive signals from and to the transmission line without interfering with other outside communication systems and which will also suppress noise and interfering electric waves entering the system from the outside.

Figure 5:
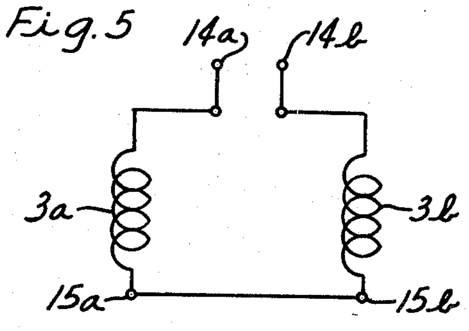
FIG. 5 is a schematic diagram illustrating how the antenna shown in FIG. 1 is interconnected.

As illustrated in FIG. 5 the vehicle antenna consists of two antennas of the same type which are installed in a spaced relation such that the distance between them is equal to an odd multiple of the transportation or crossover interval of the transmission line shown in FIG. 1. The corresponding terminals 15*a* and 15*b* of these two antennas are connected, and the remaining corresponding terminals 14*a* and 14*b* are employed as output terminals of the communication apparatus aboard the vehicle.

In regard to the reception of signals, magnetic fields at two points along the line separated from each other by the distance between cross points are in directions opposite to each other, so that a combined single voltage of receiving signal voltages of the two antennas appears across the terminals 14*a* and 14*b*, while noise and interfering electric waves which usually enter in one and the same direction do not appear at the output terminals. Conversely, if a signal is applied to the terminals 14*a* and 14*b* for excitation of the transmission line, the directions of the excited magnetic fields of the two antennas is reversed or are opposite to each other and the energy of the signal is sent into the line due to the fact that the line has a transposed structure. Furthermore, since the magnetic fields generated by the two antennas have directions opposite to each other, the electromagnetic fields radiated to the outside have mutually reversed phases, so that the radiation power as a whole becomes effectively zero. This suppresses the interference with other communication systems by the radiation emitted from the antennas.

From the foregoing description of the present invention, it becomes obvious that embodiments other than those shown in the several figures are realizable. For example, it is not absolutely necessary that the two two-wire transmission lines which are combined to make up the transmission line 1, be provided with a position shift of ½ the crossover interval. The position shift might for example be ⅓ rather than ½ this interval.

Furthermore, although the conductor pair 5, 6 is preferably excited with a signal which is out of phase with the signal applied to the conductor pair 5′, 6′ by $\pi/2$, it is here again obvious that any phase shift may be employed, other than zero or 180°, which will give a signal receiving level always greater than zero. However, the best results are naturally obtained when the phase relation is $\pi/2$ which provides the greatest combined receiving signal magnitude level.

It should also be realized that the transposition or crossover intervals of conductor pair 5, 6 need not be the same as that for the conductor pair 5′, 6′. For example, the conductor pair 5, 6 may be provided with a crossover interval which is exactly three times that of the conductor pair 5′, 6′. The two pairs may then be provided with a position shift equal to ½ the crossover interval of the pair 5′, 6′ which has the shortest crossover interval. Antennas *3a* and *3b* would then be separated by a distance equal to the crossover interval of conductor pair 5, 6 which is the longer interval of the two pairs.

We claim:

1. A transmission line for use in induction radio systems, consisting of two two-wire transmission lines each respectively having spaced parallel conductors which cross each other at regular intervals, one of said two-wire lines overlying the other in parallel with a position shift of one half the cross interval.

2. The transmission line of claim 1 characterized by means to excite each of said two-wire lines with identical signals having a phase difference of $\pi/2$.

3. A transmission line for use in induction radio systems, comprising two two-wire transmission lines each respectively having spaced parallel conductors which cross each other at regular intervals, one of said two-wire lines overlying the other in parallel with a position shift to separate their respective crossover intersections and exciter means to excite each of said two-wire lines with identical signals having a phase difference which permits the induced signal receiving level emitted from the transmission line to always be greater than zero.

4. The transmission line of claim 3 characterized by two receiving antennas of the same type coupled with said transmission line and mounted for movement therealong, said antennas being separated by an odd number multiple of the cross interval of one of said two-wire lines and having their terminals connected to permit said antennas to receive the signal from said transmission line.

5. An induction radio system for vehicles following a fixed route comprising two two-wire transmission lines positioned along said route and each having two spaced parallel conductors, each of said two-wire lines having their respective conductors crossing each other at regular and equal intervals, one of said two-wire lines overlying the other in parallel with a position shift of one half the cross interval, exciter means to excite each of said two-wire lines with identical signals having a phase difference of $\pi/2$, and two antennas of the same type carried by said vehicle and coupled with said transmission line, said antennas being separated by an odd number multiple of said cross intervals and having their terminals connected to permit said antennas to receive the signal from said transmission line.

6. A transmission line for use in induction radio systems, comprising two two-wire transmission lines each having regularly recurrent line transpositions and superimposed on each other with a position shift.

7. The transmission line of claim 6 characterized in that the transposition interval of each two-wire line is equal.

References Cited

UNITED STATES PATENTS

| | | | |
|---|---|---|---|
| 1,615,896 | 2/1927 | Affel | 179—82 |
| 2,122,145 | 6/1938 | Kear et al. | 179—82 |

KATHLEEN H. CLAFFY, Primary Examiner

W. A. HELVESTINE, Assistant Examiner

U.S. Cl. X.R.

246—8; 343—6.5